United States Patent [19]
Lorenz

[11] Patent Number: 5,714,070
[45] Date of Patent: Feb. 3, 1998

[54] PROCESS FOR REMOVING SOLVENT AND NITROCELLULOSE RESIDUES FROM POLYOLEFIN SHREDS

[75] Inventor: Arnulf Lorenz, Dresden, Germany

[73] Assignee: Nordenia Verpackungswerke GmbH, Steinfeld, Germany

[21] Appl. No.: 284,553

[22] PCT Filed: Dec. 16, 1993

[86] PCT No.: PCT/DE93/01207

§ 371 Date: Aug. 9, 1994

§ 102(e) Date: Aug. 9, 1994

[87] PCT Pub. No.: WO94/14883

PCT Pub. Date: Jul. 7, 1994

[30] Foreign Application Priority Data

Dec. 18, 1992 [DE] Germany .................. 42 42 858.0

[51] Int. Cl.⁶ .................................................. B01D 11/04
[52] U.S. Cl. .................. 210/634; 134/10; 134/26; 210/774; 210/805; 210/806; 264/37; 264/DIG. 69
[58] Field of Search ................. 134/26, 10, 11, 134/30; 210/634, 770, 259, 806, 800, 804, 173, 175, 180, 182, 257.1, 511, 774, 805; 264/37, 140, DIG. 69

[56] References Cited

U.S. PATENT DOCUMENTS

| | | | |
|---|---|---|---|
| 3,764,384 | 10/1973 | Berni | 134/10 |
| 4,379,525 | 4/1983 | Nowicki et al. | 241/20 |
| 4,379,724 | 4/1983 | Kashiwagi | 134/10 |
| 4,421,780 | 12/1983 | Buzio et al. | 134/30 |
| 4,680,060 | 7/1987 | Gupta et al. | 134/26 |
| 4,746,422 | 5/1988 | Grimm | |
| 4,760,717 | 8/1988 | Ponzielli | 210/173 |
| 4,797,128 | 1/1989 | Fowler | 8/137 |
| 5,110,055 | 5/1992 | Teeny | 241/15 |
| 5,169,558 | 12/1992 | Estepp | 264/DIG. 69 |
| 5,225,130 | 7/1993 | Deiringer | 264/DIG. 69 |
| 5,248,593 | 9/1993 | Schumacher et al. | 210/806 |
| 5,266,124 | 11/1993 | Al-Jumah et al. | 134/26 |
| 5,368,796 | 11/1994 | Lorenz et al. | 264/37 |

FOREIGN PATENT DOCUMENTS

| | | |
|---|---|---|
| 359106 | 3/1990 | European Pat. Off. . |
| 521418 | 7/1993 | European Pat. Off. . |
| 4122277 | 1/1993 | Germany . |

OTHER PUBLICATIONS

Derwent Publications Ltd., Japanese No. 49,107,070 Oct. 1974.

*Primary Examiner*—Joseph W. Drodge
*Attorney, Agent, or Firm*—Collard & Roe, P.C.

[57] ABSTRACT

Processes are described for the removal of solvent and/or nitrocellulose residues from precleaned polyolefin, in particular from precleaned polyethylene recyclate shreds, whereby the polyolefin is either mixed with washing water, the solvent is expelled and the nitrocellulose is at the same time washed from the polyolefin, or the polyolefin is washed with cleaned solvent, the solvent is mechanically separated, and the solvent residues remaining on the polyolefin are expelled by a stream of nitrogen.

19 Claims, 2 Drawing Sheets

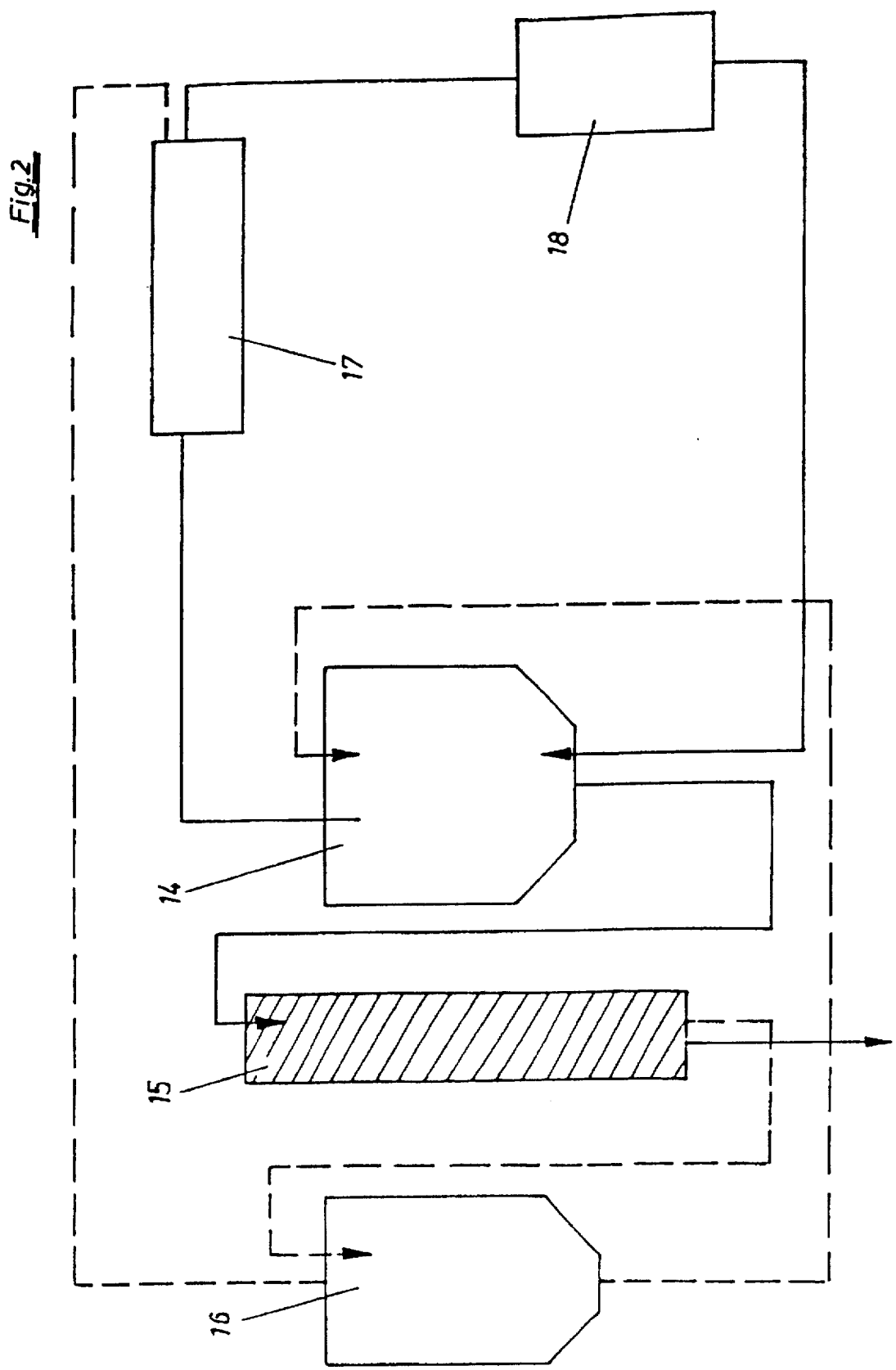

PROCESS FOR REMOVING SOLVENT AND NITROCELLULOSE RESIDUES FROM POLYOLEFIN SHREDS

BACKGROUND OF THE INVENTION

1. Field of the Invention

The invention relates to a process for cleaning polyolefin, in particular polyethylene recyclate shreds, as well as to devices for carrying out the process.

2. The Prior Art

Polyethylene is a polyolefin, which is processed in large quantities for the manufacture of foils for packaging purposes. For example, shrink hoods, bags and the like are manufactured from the foils.

Polyethylene, as a thermoplastic material, is fusible and formable repeatedly because of its molecular structure. It is basically suitable for being reused several times. However, reprocessing to high-quality recycling products, preferably to polyethylene foils with defined properties, is opposed by the fact that the used articles, particularly foils, are equipped during their manufacture with application-oriented additives such as antistatic agents, lubricants, thermal or UV-stabilizers, which are then present in unknown amounts and combinations in the recycling product manufactured from such articles. Sorting of the used articles according to ingredient substances is hardly possible technically and economically speaking.

Recycling products, in particular foils loaded with such ingredient substances lead to problems during further processing, for example during gluing, welding or imprinting. Often, the connecting seams, which initially show good properties, come apart only at the user.

Furthermore, the used foils contain degradation products of the polyethylene such as polyethylene waxes, as well as decomposition products of the additives. Such products develop during the life span in the course of processing processes, as well as due to the action of heat, light and weathering. They effect to some extent a considerable reduction of the properties of use of the recycling product.

Finally, the used foils, in particular packaging foils, are more or less heavily imprinted. During the extrusion of recycled materials, such printing inks lead to polyethylene foils with a strong undefined discoloration, so that only refuse bags dyed in dark colors can be manufactured from such materials. With very high proportions of imprinted areas in relation to the amount of polymer, even unusable regranulates foamed by decomposition gases can be obtained.

For removing the foil additives, the nonpolar polyethylene waxes and the adhering printing inks from the used foils, DE-OS 4 122 277 discloses a known method. It specifies a process in which the used foils are shredded and, under intensive motion, subjected to an extraction in a solvent bath containing an organic solvent.

The shreds treated under heat with an organic solvent, following mechanical separation of the solvent, still contain about 50 to 60% by weight solvent, for example in the case of ethyl acetate. The solvent can be found both on the surfaces of the shreds and diffused into the interior of the shreds. In addition, on the surface, the shreds contain residues of nitrocellulose, the preferred vehicle for flexographic printing inks. Such residual amounts of nitrocellulose, even though low, lead to carbonization during regranulation, and thus to black spots in the recyclate foil.

SUMMARY OF THE INVENTION

It is an object of the present invention to provide processes by which polyolefin, preferably in the form of polyethylene shreds, can be cleaned.

According to the invention, this object is achieved by a process for the removal of solvent and/or nitrocellulose residues from precleaned polyolefin, particularly from precleaned polyethylene recyclate shreds, said process being characterized in that the polyolefin is mixed with water, the solvent is either expelled or separated by extraction, and the residues of nitrocellulose are at the same time washed off from the surfaces of the polyolefin shreds.

In the process according to the invention, expelling and/or extraction can take place continuously or discontinuously.

In a special implementation of the process, ethyl acetate is used as the solvent.

In a discontinuous procedure, for example in an evaporator, the solvent, preferably ethyl acetate, is expelled or evaporated from the surface of the polyolefin under stirring at a temperature above the boiling temperature of the solvent.

In the case of ethyl acetate, 30 minutes stirring at a temperature of 85° to 90° C. suffices.

A weight ratio of polyolefin shreds to washing water of 1:8 to 1:10 was found to be advantageous.

In the continuous mode of operation, the polyolefin shreds are freed from the solvent by means of water slightly below the boiling temperature of the solvent, preferably at a temperature of 70° to 75° C. A multi-chamber extractor was found to be suitable for this process. In the latter, the water passes through individual chambers filled with shreds as a concretely adjustable, continuous volume flow over a defined period of time. The water is guided countercurrently to the polyolefin shreds.

After said washing and extracting process, the polyolefin shreds are again flashed for 5 to 10 minutes with water of high turbulence. The rinsing water can be circulated through an integrated filter for cleaning the water. The rinsing action still removes nitrocellulose residues from the surfaces of the polyolefin shreds and separates finest mineral impurities which have been carried along up to this point.

In a special form of implementation of the invention, the solvent loaded with printing ink pigments and vehicles, foil ingredients as well as lubricants and antistatic agents, said solvent having been separated from the polyolefin shreds mechanically prior to the treatment with water, is passed into a precipitation vessel downstream.

The precipitation for the quantitative separation of the flexographic printing ink vehicle nitrocellulose from the solvent can take place with the washing water. Advantageously, the precipitation takes place under stirring at a temperature of 30° to 70° C. and with a precipitation duration of 10 minutes. Preferred is a temperature of 30° to 40° C. and a weight ratio of solvent to water of 1:1.

In this precipitation process, the water-insoluble printing ink pigments are completely precipitated at the same time together with the nitrocellulose.

The solvent vapors forming during the washing process are condensed, collected and passed into a solvent tank. This tank serves as the supply tank for the solvent, from where the solvent can be used again in the cleaning and extracting process as a circulation solvent.

The separation of a three-phase mixture solvent/solids precipitate/water forming during the precipitation can take place in a phase separation bottle.

The precipitate of solids from the three-phase mixture can be separated by filtration, and the water can be used again as circulation washing water, whereby the water can be decolored, if need be, via a column with active carbon.

The main portion of solvent in the precipitate of solids is stirred for a certain time with hot water of about 90° C. in a vessel connected downstream, where the solvent is expelled. Furthermore, for completely removing the solvent from the precipitate of solids, stripping can be carried out with steam to make the solids solvent-free, and the solvent can be reused following condensation. The precipitate agglomerates and can be separated mechanically without problems. The solvent is condensed and can be reused as circulation solvent. In this way, the solids precipitate is discharged water-moist and free of solvent and thus satisfies the safety regulations for transport and disposal with respect to nitrocellulose.

The solvent-enriched water from the phase separation can be completely used again for the precipitation of the nitrocellulose.

The solvent from the phase separation has been previously cleaned. Thus a partial stream of this solvent can be recirculated and used as the solvent in the cleaning step. For example, it may be used for the separation of the printing inks. This partial stream can be controlled via a suitable measuring analysis of the solvent after the phase separation. For example, measurement of the refractive index or of the depth of the color is suitable for the measuring analysis.

The other part of the solvent is passed as a partial stream into an evaporator plant for treatment and/or purified via an adsorber column. In this way, this part of the solvent can be completely reused for extraction by recirculation from the solvent supply tank.

This procedure permits a reduction of the amount of solvent required per unit of quantity polyolefin shreds to a technically required minimum amount, whereby the full efficiency of the cleaning and extracting process is assured. At the same time, the evaporator output required per unit of quantity polyolefin shreds, i.e., the energy cost for the evaporation is reduced to a minimum.

During evaporation, a residue is collected with the main components polyethylene waxes and smaller proportions of higher fatty acids, fatty acid derivatives, phthalates and lacquered printing ink pigments. These residues can be reused as valuable substances for selected applications, for example for the manufacture of certain foil assortments such as, for example, dyed refuse bags.

According to a second process variation, complete cleaning of the partial stream of solvent from the phase separation is accomplished by sorption. The attendant substances such as phthalates, polyethylene waxes and small proportions of printing ink pigments still remaining in the solvent after the precipitation with water are separated. So-called adsorber earths such as, for example, magnesium-aluminum hydrosilicates are suitable for such a process. Special active carbons as well as combinations of the two adsorbents are suitable as well. The complete omission of an evaporator plant is advantageous with this process variation; however, the increased costs for the disposal of both the loaded adsorber substance and attendant substances in the solvent are disadvantageous.

The two partial streams can be jointly admitted into the solvent tank and thus completely reused for a new cleaning and extracting process.

Another variation makes provision for the cleaning of the entire loaded solvent following cleaning and extracting without water precipitation, by high-efficiency filtration, which can be carried out in combination with adsorption or evaporation.

An example of operation showing additional inventive features is schematically shown in FIG. 1.

BRIEF DESCRIPTION OF THE DRAWINGS

FIG. 2 shows a second embodiment of the invention.

DETAILED DESCRIPTION OF PREFERRED EMBODIMENTS

Figure 1:
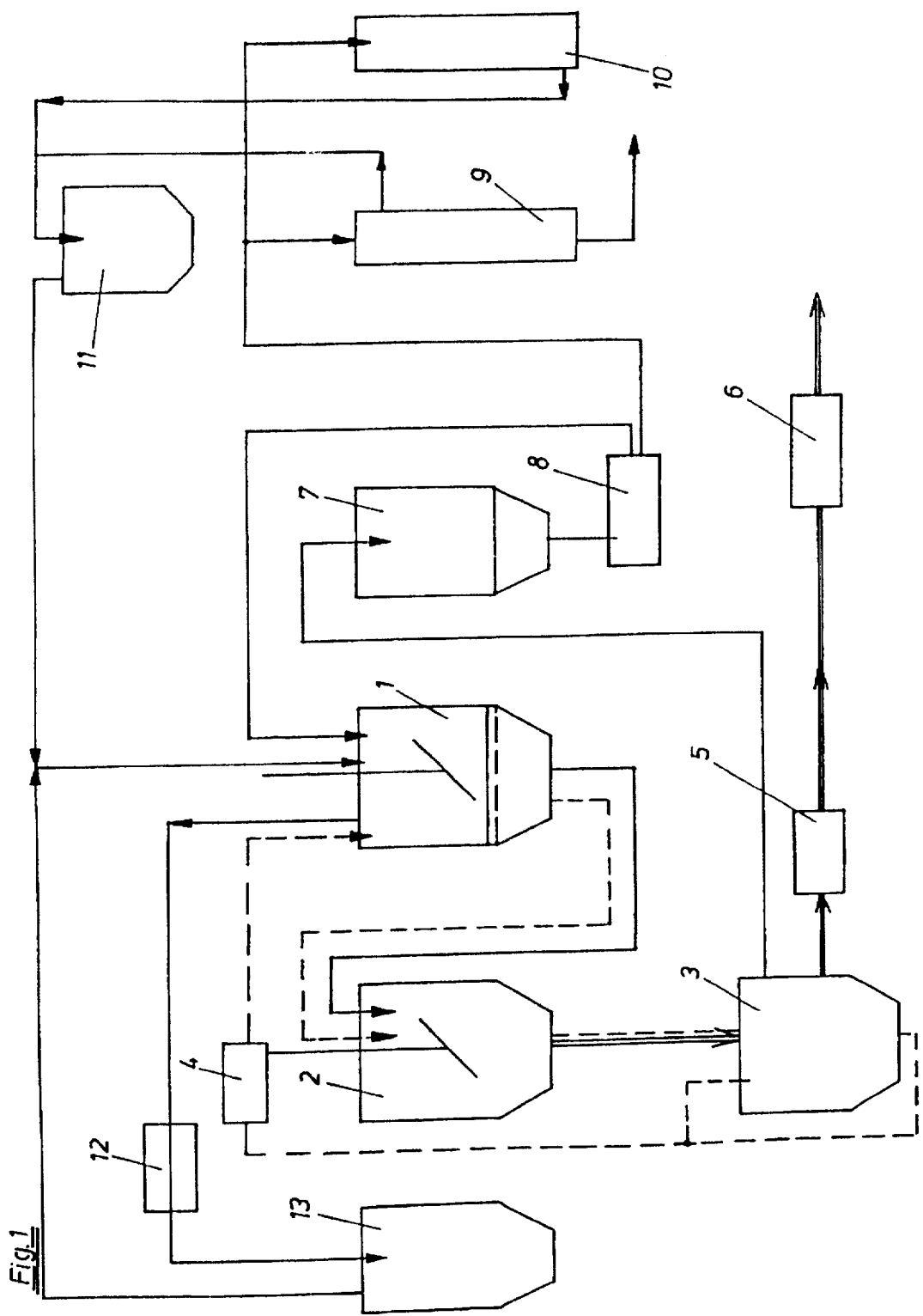
FIG. 1 shows a flow diagram explaining the course of the process according to the invention.

In FIG. 1, the dashed lines show the flow of the water; the thin, through-extending lines show the flow of the solvent; and the double lines the flow of solids.

Used polyolefin shreds in ethyl acetate as the solvent are loaded in a cleaning and extracting reactor 1, which also can have the function of a solvent bath.

As soon as the cleaning and extraction is completed, ethyl acetate loaded with foil ingredients, printing ink pigments and printing ink vehicles as well as polyethylene waxes is mechanically separated from the polyolefin shreds, and passed into a downstream precipitation vessel 2, which is equipped with an agitator as well.

The shreds are suspended with water of 85° to 90° C. and washed under strong motion. It is important in this connection that the temperature of the water is above the boiling point of the ethyl acetate, so that the latter is evaporated.

The liberated solvent vapors can be passed into a solvent tank via a condensation line downstream.

Subsequently, the solvent-free shreds are mechanically separated from the washing water.

The washing water, which is loaded with residues of nitrocellulose and ethyl acetate, can be fed into the precipitation vessel 2 as well in order to precipitate the nitrocellulose. The precipitation is carried out at a temperature of 30° to 40° C., with a precipitation duration of 10 minutes and with a ethyl acetate/water ratio of 1:1. From the precipitation vessel 2, the mixture of ethyl acetate/solids precipitate/water is passed into a phase separation bottle 3, in which the mixture is separated into the individual phases.

The solids are separated from the mixture by a filtration device 5 and subsequently stripped solvent-free with steam. Via a partial dehydration device 6, which operates mechanically or thermally downstream, the solids precipitate can be adjusted to the residual moisture required for safety reasons with respect to the nitrocellulose.

Part of the water is fed into the precipitation vessel as circulation water. The other part can be decolored, if necessary, via a column with active carbon 4. The water so cleaned is now recycled again into the cleaning and extracting plant as circulation washing water in order to free the polyolefin shreds from the residual solvent and nitrocellulose residues.

The solvent from the phase separation is fed into a buffer vessel 7 and subsequently analyzed in an analyzer device 8.

A partial stream can be reused directly as circulation solvent for the process stage of cleaning. The other part of the solvent is passed into an evaporator plant 9 or adsorber 10, where it is completely cleaned. The cleaned solvent is subsequently collected in a supply tank 11 and used as circulation solvent in the process stage of extraction.

The solvent vapors exiting from the reactor 1 are condensed by the condenser 12 and the solvent is passed into a supply tank 13. From there, the solvent can be used again as circulation solvent for the cleaning in the reactor 1.

According to the invention, the problem specified above is solved, furthermore, by a process for the cleaning of polyolefin, particularly of old polyethylene foil shreds, said process being characterized in that the polyolefin shreds are freed from loose impurities via a mechanical dry cleaning, and mixed in the process step of cleaning with a mixture of solvent and water, whereby the three-phase mixture is already formed in the reactor, which mixture can be subsequently passed directly into the phase separation bottle.

In said process, the polyolefin shreds with the residual dirt portion rigidly adhering to said shreds are subjected to cleaning and extraction with the solvent without prior washing with water. The dirt particles introduced in the process are found to be advantageous for the precipitation of the nitrocellulose with water because they promote the formation of condensation nuclei. This considerably enhances the filterability of the solids precipitate.

Fine dirt particles carried along through the process steps of cleaning and extraction are treated in a rinsing process with clean water after the residual solvent has been removed from the shreds.

A filter for separating the solid particles is installed in the rinsing water circulation. The duration of the rinsing operation can be controlled via a measuring system, measuring, for example the degree of turbidity. It is particularly advantageous with said process of the invention that the polyolefin shreds are no longer cleaned from dirt via costly washing with water. Therefore, a reduction of the operating cost can be obtained with said variation of the process of the invention.

According to another process variation for the cleaning of polyolefin, particularly of old polyethylene foil shreds, the polyolefin shreds after a mechanical dry cleaning, are subjected to a first short cleaning step with a solvent/water mixture using high frictional motion.

Preferably, the ratio of solvent-to-water comes to 1:1 to 1:3; the reaction time maximally amounts to 5 minutes at a temperature of 50° to 60° C. The three-phase mixture already forming in said process step can be directly discharged into the phase separation bottle. Said variation according to the invention has the advantage that cleaning of the polyolefin shreds via washing with water is dispensed with. Furthermore, the residual dirt rigidly adhering to the shreds is already completely separated after the mechanical dry cleaning process step of cleaning.

Furthermore, the problem specified above is solved according to the invention by a process for the removal of solvent and/or nitrocellulose residues from precleaned polyolefin, in particular from precleaned polyethylene recyclate shreds, said process being characterized in that the polyolefin is washed with cleaned solvent, the solvent is mechanically separated, and the solvent residues remaining on the polyolefin are expelled by a stream of nitrogen.

Ethyl acetate is preferred as the solvent.

Shredded polyethylene foils which have been precleaned by extraction processes can be used as the polyolefin.

The polyolefin, which, for example, has been treated for a period of 30 minutes under heat with ethyl acetate, still carries about 50 to 60% by weight ethyl acetate after it has been mechanically separated from the ethyl acetate.

According to a preferred implementation of the invention, the solvent carried along is expelled by a nitrogen stream of about 85° to 90° C.

The solvent carried along in the stream of nitrogen, following separation of the solvent from the nitrogen and intermediate storage in a solvent supply vessel, can be used again as circulation solvent.

According to another advantageous implementation of the invention, the nitrogen freed from the solvent is heated via a heat exchanger to 70° to 90° C. and used again as circulation nitrogen for removing the solvent from the polyolefin.

According to another advantageous development of the process, the mechanically separated washing solvent— which is loaded with foil ingredients such as lubricants, antistatic agents and polyethylene waxes, is passed via an adsorber column, in which adsorber earths of the magnesium-aluminum hydrosilicate type can be used as adsorber substances in combination with active carbon. In this way, ethyl acetate is almost completely separated from all attendant substances. The solvent so decolored and cleaned can be collected in the solvent supply vessel and also used again as circulation solvent for further cleaning and extraction processes.

An example of operation showing additional features according to the invention is schematically shown in FIG. 2.

FIG. 2 shows a flow diagram explaining the course of said process according to the invention.

For the removal of nitrocellulose residues from precleaned polyethylene recyclate shreds, cleaned ethyl acetate is loaded in a cleaning vessel 14. The washing process is supported by an agitator device in the cleaning vessel 14. The solvent is mechanically separated and cleaned via an adsorber column 15 downstream, with a solvent container 16 being connected downstream of said column.

The ethyl acetate residues remaining on the polyethylene are expelled by a stream of nitrogen having a temperature of 85° to 90° C. The ethyl acetate carried along in the stream of nitrogen is freed from the nitrogen by a cold set 17 and used again as circulation ethyl acetate via the solvent container 16.

The nitrogen freed from the ethyl acetate is heated via a heat exchanger 18 and used as circulation nitrogen.

I claim:
1. Process for removing solvent and nitrocellulose residues from precleaned polyolefin shreds comprising precleaned polyethylene recyclate shreds, comprising the steps of mixing the polyolefin shreds with washing water, expelling the solvent by heating the water to a temperature above the boiling temperature of the solvent;

washing the nitrocellulose residues from each surface of the polyolefin shreds, using the washing water for precipitating nitrocellulose from the solvent; and collecting solvent in the form of vapors during washing and passing said vapors into a solvent tank and, using the collected solvent as circulation solvent.

2. Process according to claim 1, wherein the expelling takes place continuously discontinuously.

3. Process according to claim 1, wherein ethyl acetate is used as the solvent.

4. Process according to claim 3, comprising heating the water under stirring to a temperature of 85° to 90° C.

5. Process according to claim 1, wherein the weight ratio of polyolefin shreds to washing water ranges from 1:8 to 1:10, and time of mixing is 30 minutes.

6. Process according to claim 1, wherein the duration of precipitation is 10 minutes and the at a temperature ranges from 30° C. to 70° C.

7. Process according to claim 1,
wherein the temperature in the preparation step ranges from 30° C. to 40° C. and the weight ratio of solvent to water is 1:1.

8. Process according to claim 1, further comprising the step of
separating the precipitate which comprises a mixture of solvent/water/solids precipitate into solvent, water and solids precipitate by means of a phase separation bottle.

9. Process according to claim 8, further comprising the steps of
separating a solids precipitate from the three-phase mixture by filtration and using the water, as circulation washing water, whereby the water is first decolored, via a column with active carbon.

10. Process according to claim 9, further comprising the steps of
stripping the solids precipitate to be solvent-free with steam and reusing the stripped solvent following condensation.

11. Process according to claim 1, comprising
cleaning the collected solvent by precipitation with water to such a degree that following phase separation, it can be directly used in a first partial stream as circulation solvent in a cleaning process step.

12. Process according to claim 11, comprising
cleaning the collected solvent in a second partial stream via an evaporator plant and/or an adsorber column.

13. Process for removing solvent and nitrocellulose residues from precleaned polyolefin, comprising the steps of
washing the polyolefin with cleaned ethyl acetate as solvent;
mechanically separating the solvent; and
expelling remaining solvent residues from the polyolefin by a nitrogen stream.

14. Process according to claim 13,
wherein the nitrogen stream has a temperature of 85° to 90° C.

15. Process according to claim 13, comprising
freeing the solvent carried along in the nitrogen stream from nitrogen via a cold set and, using the freed solvent again via a solvent container as circulation solvent.

16. Process according to claim 15, further comprising the steps of
heating nitrogen freed from solvent via a heat exchanger to 70° C. to 90° C. and using the nitrogen again.

17. Process according to claim 13, comprising
passing the mechanically separated washing solvent via an adsorber column and cleaning said solvent in said column, and
using said solvent again via a solvent container.

18. Process according to claim 17, comprising
using magnesium-aluminum silicate as an adsorber in the adsorber column in combination with active carbon.

19. Process for removing solvent and nitrocellulose residues from precleaned polyolefin shreds comprising the steps of
mixing the polyolefin shreds with washing water;
expelling the solvent by heating the water to a temperature above the boiling temperature of the solvent;
washing the nitrocellulose residues from each surface of the polyolefin shreds; and
using the washing water for precipitating nitrocellulose from the solvent.

* * * * *